United States Patent
Vinod et al.

(10) Patent No.: US 9,716,639 B2
(45) Date of Patent: Jul. 25, 2017

(54) PROTECTION SWITCHING METHOD AND SYSTEM

(75) Inventors: Kumar Madaiah Vinod, Bangalore (IN); Ojha Somnath, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 396 days.

(21) Appl. No.: 13/343,012

(22) Filed: Jan. 4, 2012

(65) Prior Publication Data
US 2013/0003532 A1    Jan. 3, 2013

Related U.S. Application Data

(63) Continuation of application No. PCT/IN2010/000454, filed on Jul. 7, 2010.

(30) Foreign Application Priority Data

Jul. 8, 2009    (IN) .......................... 1611/CHE/2009

(51) Int. Cl.
*H04L 12/707*    (2013.01)
*H04L 12/26*    (2006.01)
*H04L 12/703*    (2013.01)

(52) U.S. Cl.
CPC .......... *H04L 43/0811* (2013.01); *H04L 45/22* (2013.01); *H04L 45/28* (2013.01)

(58) Field of Classification Search
USPC ..... 714/4.11; 370/244, 225, 228, 241.1, 219
See application file for complete search history.

(56) References Cited

U.S. PATENT DOCUMENTS

| | | | |
|---|---|---|---|
| 2010/0135291 A1* | 6/2010 | Martin | H04L 45/00 370/389 |
| 2011/0026397 A1* | 2/2011 | Saltsidis | H04L 41/0663 370/228 |
| 2012/0127868 A1* | 5/2012 | Wang | H04L 43/0811 370/244 |
| 2012/0147741 A1* | 6/2012 | Wei | H04L 12/413 370/225 |

(Continued)

OTHER PUBLICATIONS

"Provider Backbone Bridge with Traffic Engineering: A Carrier Ethernet Technology Overview", Diallo, 2009, EXPO Electro Optical Engineering Inc., retrieved from http://www.rootscomm.com/products/tms/files/exfo_anote210-ang.pdf, retrieved on Dec. 7, 2013.*

(Continued)

*Primary Examiner* — Andrew Lai
*Assistant Examiner* — Jamaal Henson
(74) *Attorney, Agent, or Firm* — Oliff PLC

(57) ABSTRACT

A network topology including at least one protection infrastructure segment for each work infrastructure segment, such that the work infrastructure segment and the corresponding protection infrastructure segment terminate on the same nodes, wherein the two protection infrastructure segments pass through at least one bridge node, monitoring for failure in the work and protection infrastructure segment in the network, switching Traffic Engineered Service Instance (TESI) over high priority protection infrastructure segment, and provisioning two SPG of co-joint node to prevent infrastructure segment from forwarding ambiguity and retracing of the TESI.

12 Claims, 5 Drawing Sheets

(56) References Cited

U.S. PATENT DOCUMENTS

2012/0300617 A1* 11/2012 Ao .............................. 370/218

OTHER PUBLICATIONS

"Ethernet as a Carrier Grade Technology: Developments and Innovations", Sanchez et al., IEEE Communications Magazine, Sep. 2008, retrieved from http://ieeexplore.ieee.org/stamp/stamp.jsp?tp=&arnumber=4623712, retrieved on Dec. 7, 2013.*

* cited by examiner

PROTECTION SWITCHING METHOD AND SYSTEM

REFERENCE TO RELATED APPLICATIONS

This application is a continuation of PCT/IN2010/000454, filed 7 Jul. 2010, which is hereby incorporated by reference. This application claims priority from Patent Application No. IN 1611/CHE/2009, filed 8 Jul. 2009, which is hereby incorporated by reference.

FIELD OF THE INVENTION

This invention relates generally to communication networks and more particularly protection of Traffic Engineered Service Instance (TESI) over Provider Backbone Bridged Network (PBBN).

BACKGROUND OF THE INVENTION

Data communication networks may include various computers, servers, nodes, routers, switches, bridges, hubs, proxies, and other network devices coupled to and configured to pass data to one another. These devices will be referred to herein as "network elements". The various network elements on the communication network communicate with each other using predefined sets of rules, referred to herein as protocols.

Different protocols are used to govern different aspects of the communication, such as how signals should be formed for transmission between network elements, various aspects of what the protocol data units should look like, how protocol data units should be handled or routed through the network by the network elements, and how information associated with routing information should be exchanged between the network elements.

Ethernet is a well known networking protocol that has been defined by the Institute of Electrical and Electronics Engineers (IEEE) as standards 802.1 and 802.3. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

A domain implemented using this Ethernet standard will be referred to as a Provider Bridging Network (PBN) or Backbone Bridging Network (PBBN) domain. 802.1Q, 802.1 ad, and 802.1 ah all use one or more spanning tree instances in the control plane to determine which links should be active and which should be blocked to prevent the formation of loops. An Ethernet network domain that implements one or more spanning trees on the control plane will be referred to herein as a spanning tree controlled Ethernet network domain.

Since a spanning tree requires all data to flow on particular selected links on the network, the network links that are part of the spanning tree may experience congestion. IEEE 802.1Qay was developed to allow traffic engineered paths to be defined on the network so that traffic could be forwarded over links not forming part of the spanning tree.

IEEE 802.1Qay defines Traffic Engineered Service Instance (TESI) which carries client layer or customer traffic under no failure or normal condition is called work or primary TESI. Upon failure of primary TESI, another backup TESI could be made to carry client layer or customer traffic; such TESI is called protect or backup TESI. Multiple backup TESIs could be associated with one primary TESI. Together, primary and backup TESIs form a group called Protection Group (PG). TESI PG is an end-to-end protection mechanism where each TESI is configured to traverse Backbone Edge Bridges (IB-BEBs) and Backbone Core Bridges (BCBs) by appropriately populating forwarding entries in the forwarding database (FDB).

The sequence of bridges (i.e., the physical resources or networking infrastructure) over which FDB is provisioned define an infrastructure segment. In general, a sequence of Local Area Network (LAN) ports and the intervening LANs and bridges form an infrastructure segment. End ports of an infrastructure segment are called Segment End-point Ports (SEPs). FIG. 1 shows an example when TESI is provisioned or routed through backup infrastructure segment under fault condition in a network.

Whenever the communication failure occurred on at least two tandem primary work infrastructure segments the TESI will be locally re-routed over backup or protection infrastructure segment of TESI. FIGS. 2 and 3 shows a topology, where we have two segment protection domains adjacent to each other. Unlike the topology shown in FIG. 2, we have forwarding ambiguity on bridge 6 (as shown in FIG. 3), because TESI forwarding entry is maintained on two ports of bridge 6 i.e. one towards node 4, and another towards node 5.

When segment between bridges 3 and 4 fails, TESI will be locally re-routed over backup infrastructure segment; thereby flowing over bridges 3-6-4. Bridge 6 has to forward the TESI data and control frames towards bridge 4. Since, TESI forwarding information is pre-provisioned on two ports of bridge 6: One towards bridge 4, and another towards bridge 5, over which port should bridge 6 forward the TESI? Thus there exist problem of forwarding ambiguity at bridge 6. Also, at bridge 6, the TESI has to retrace the path between bridge node B6 and B4 twice (i.e. TESI has to flow from B3-B6-B4 then return path B4-B6-B5) which leads to wastage of bandwidth and time in the network For the reasons stated above, which will become apparent to those skilled in the art upon reading and understanding the specification, there is a need in the art for protection of TESI over Adjacent Segment Protection Domain without Forwarding Ambiguity using Segment Protection Groups.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the invention there is provided a protection switching method for an infrastructure segment of a Traffic Engineered Service Instance (TESI) having communication failure in a Provider Backbone Bridged Network (PBBN), wherein the communication failure occurred on at least two tandem work infrastructure segments, the method comprising: identifying a network topology including at least one protection infrastructure segment for each work infrastructure segment, such that the work infrastructure segment and the protection infrastructure segment terminate on the same nodes, called segment-end nodes, wherein the two protection infrastructure segments pass through at least one bridge node, called a co-joint node, monitoring for failure in the work and protection infrastructure segment in the network; defining Segment Protection Group (SPG) for each work infrastructure segment including work infrastructure segment rooted at the co-joint node, wherein the SPG is formed by a set of work infrastructure segment and the protection infrastructure segments and switching Traffic Engineered Service Instance (TESI) over high priority protection infrastructure segment by provisioning two SPG of co-joint node to prevent infrastructure segment from forwarding ambiguity and retracing of the TESI.

In another embodiment of the present invention the method includes identifying the first SPG of the co-joint node comprising at least one protection infrastructure segment and work infrastructure segment, such that work infrastructure segment and the protection infrastructure segment initiate from the co-joint node and terminates on the segment end node towards the destination node.

In yet another embodiment of the present invention the method includes identifying the second SPG of the co-joint node comprising at least one protection infrastructure segment and work infrastructure segment, such that work infrastructure segment and the protection infrastructure segment initiate from the co-joint node and terminates on the segment end node towards the source node.

In still another embodiment of the present invention the method includes pre-provisioning TESI forwarding entities in intermediate bridges forming protection infrastructure segment.

In another embodiment of the present invention the method includes reversioning of TESI onto work infrastructure segment upon recovery from the failure.

In yet another embodiment of the present invention the method includes instantiating a Maintenance End Point (MEP) on Segment End-Point Ports (SEP) of the infrastructure segment and Maintenance Intermediate Point (MIP) on Segment Intermediate Ports (SIP).

In yet another embodiment of the present invention the method includes checking for segment-continuity check message on the SEP of the work infrastructure segment and protection infrastructure segment.

In yet another embodiment of the present invention the method includes failing to receive the segment continuity check message within a predetermined time period will indicate occurrence of fault in the infrastructure segment.

According to another aspect of the invention there is provided a protection switching system for an infrastructure segment of a Traffic Engineered Service Instance (TESI) having communication failure in a Provider Backbone Bridged Network (PBBN), wherein the communication failure occurred on at least two tandem work infrastructure segments, the system comprising: a plurality of nodes interconnected defining a topology, wherein the topology includes at least one protection infrastructure segment for each work infrastructure segment, such that the work infrastructure segment and the protection infrastructure segment terminate on the same node, called segment end nodes, wherein the two protection infrastructure segments pass through at least one bridge node called a co-joint node and a network channel connected to each of the nodes for transmitting and receiving Continuity Check Message (CCMs), wherein each node is configured for defining Segment Protection Group (SPG) for each work infrastructure segment including work infrastructure segment rooted at the co-joint node, wherein the SPG is formed by a set of work infrastructure segment and the protection infrastructure segments, monitoring any failure in the work and protection infrastructure segment in the network and switching Traffic Engineered Service Instance (TESI) over high priority protection infrastructure segment by provisioning SPG of co-joint node to prevent infrastructure segment from forwarding ambiguity and retracing of the TESI.

In another embodiment of the present invention the system includes means for pre-provisioning TESI forwarding entities in intermediate bridges forming protection infrastructure segment.

In another embodiment of the present invention the system includes means for reversioning of TESI onto work infrastructure segment upon recovery from the failure.

In yet another embodiment of the present invention the system includes, wherein the node is further configured for instantiating a Maintenance End Point (MEP) on Segment End-Point Ports (SEP) of the infrastructure segment, and Maintenance Intermediate Point (MIP) on Segment Intermediate Ports (SIP), wherein each node is capable of checking for segment continuity check message on the SEP of the work infrastructure segment and protection infrastructure segment.

Additional advantages and features of the present invention will be more apparent from the detailed description and accompanying drawings, which illustrate preferred embodiments of the invention.

DETAIL DESCRIPTION OF THE INVENTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, state, link, fault, packet, and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, routers, bridges, switches, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
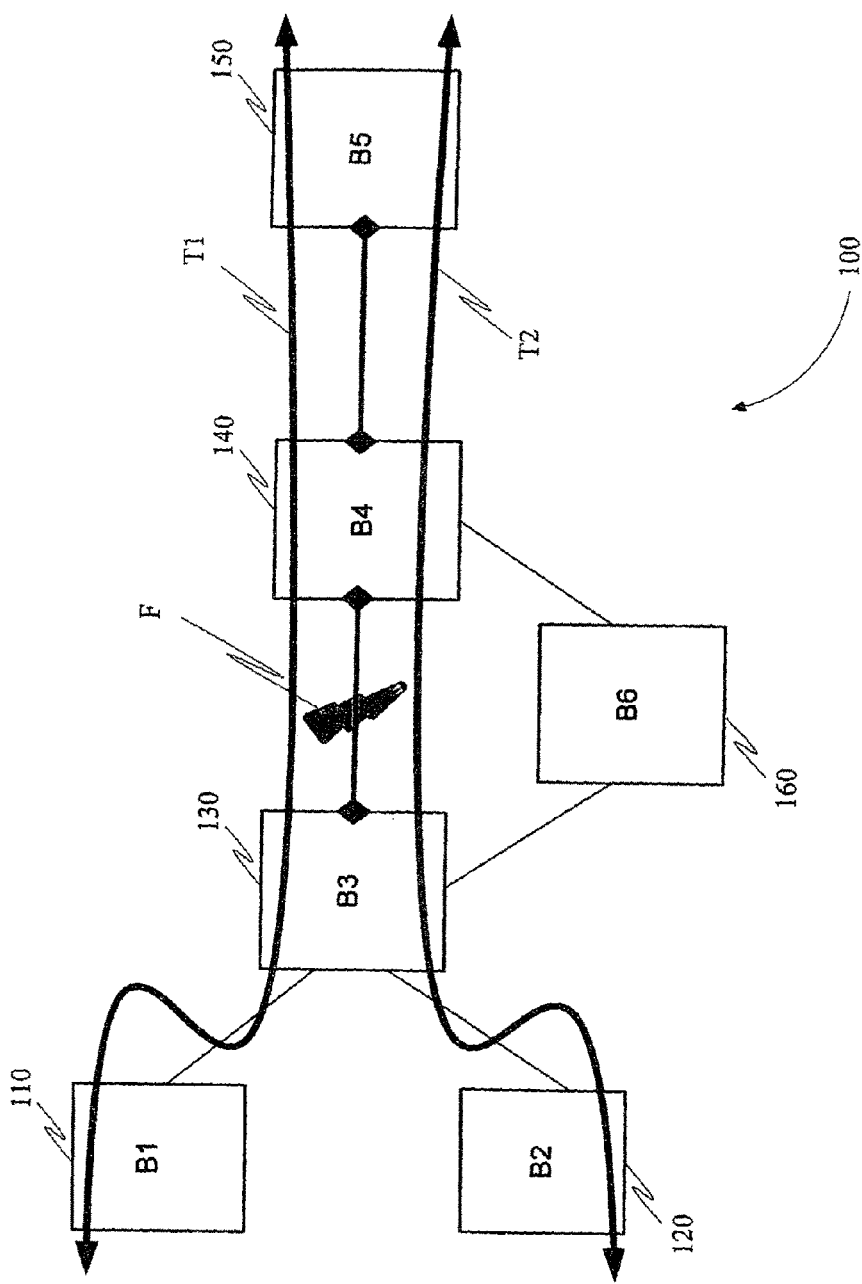
FIG. 1 shows example of network topology in which TESI flows.

FIG. 1 illustrates a network topology in which TESI flows. The network 100 (100 is not shown in figure) includes bridge nodes [(110, 120, 130, 140, 150, and 160) or (B1, B2, B3, B4, B5, and B6)] in which TEST lines T1 and T2 flows through the said bridge nodes. TESI is a traffic engineered service instance which flow over provider backbone bridged network (PBBN) as defined by IEEE 802.1Qay. The TESI that carries client layer or customer traffic under no failure or normal condition is called work or primary TESI. In the present exemplary network, the bridge node B1 (110) acts as a source node while bridge node B5 (150) act as a destination node. It should be noted that TESI is bi-directional and the reference to any particular node as source or destination is for illustration purpose only. In the prior arts, the bridge nodes used to check for the continuity between the bridge nodes forming various segments and service instances. Under no failure or normal condition, the TESI flows from source to destination (i.e. also called work or primary TESI) provisioned through the link B1-B3, B3-B4, and B4-B5. The forwarding tables are accordingly configured in the bridge nodes.

Upon failure of primary TESI, another backup TESI could be made to carry client layer or customer traffic; such TESI is called protect or backup TESI. Multiple backup TESIs could be associated with one primary TESI. In such case, each backup TESI will be identified with an integer m, as $m^{th}$ backup TESI. If M is maximum number of backup TESIs associated with one primary TESI, then m<=M. Primary TESI and backup TESIs form a protection group called Global Protection Group (GPG). GPG is not shown in the figures for simplicity.

In the present example, Edge nodes of TESI and bridge node between B3 and B4 senses a fault. During fault occurrence (for example in FIG. 1, F1), the TESI is provisioned through the bridge node B6 and allows the traffic to be forwarded from node B6 to reach the destination. The nodes may be so configured to check for CCM on work and protect segments. Based on the CCM status of segments the nodes are configured to forward the TESI or traffic on alternate segment. The TESI over work segment between bridge nodes B3 to B4 is therefore protected. Absence of CCM between the adjacent nodes B3 and B4 would not interrupt the normal traffic flow between the source and destination of TESI. As work segment is shorter than end-to-end path, work segment will protect the TESI traffic first locally before end-to-end or global TESI protection takes place.

Various types of faults may be overcome using the teachings of the present invention. For example the faults occurring due to service connectivity fault and the infrastructure connectivity faults. The infrastructure faults may comprise of faults due to node failure or link failure or mis-configuration between two nodes. Further the faults mentioned above may be unidirectional or bi-directional faults.

Figure 2:
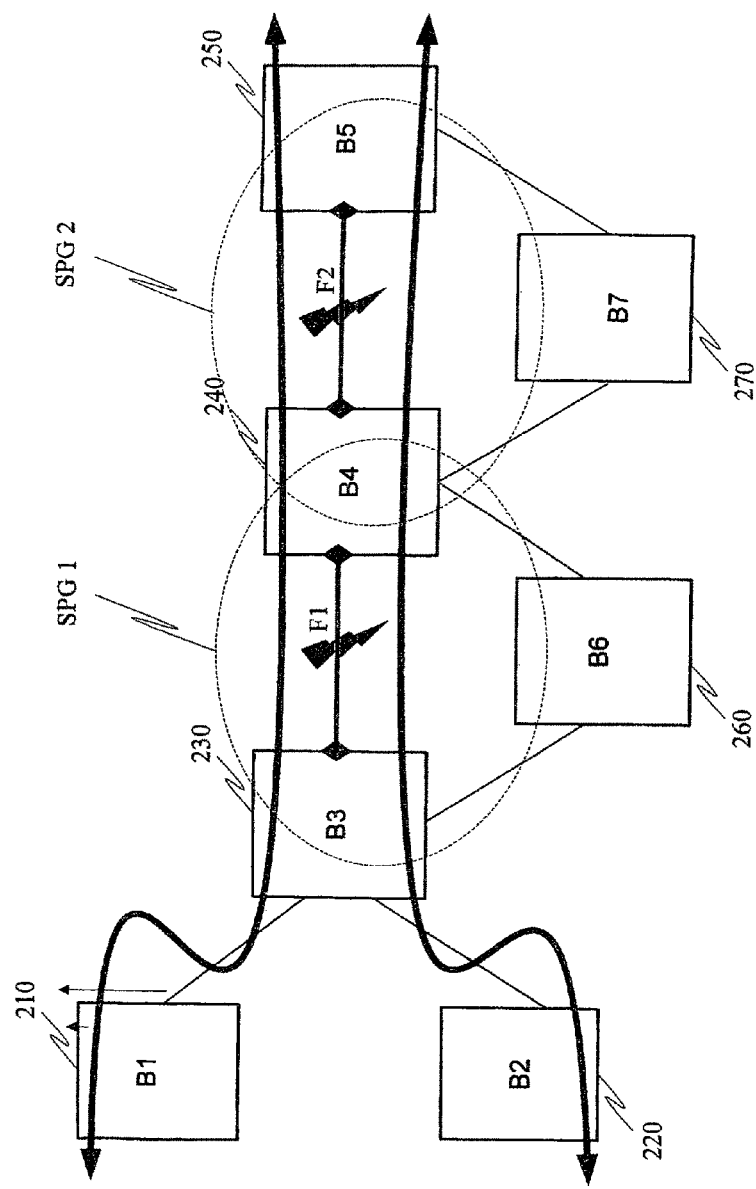
FIG. 2 illustrating a network topology having fault at tandem work segment in which TESI flows.

FIG. 2 is a block diagram of a network having tandem work segment in which TESI flows. As already explained in FIG. 1, the same network 100 (not shown) includes bridge nodes [(210, 220, 230, 240, 250, 260 and 270) or (B1, B2, B3, B4, B5, B6 and B7)] in which TESI lines T1 and T2 (T1 and T2 not shown) flows through the said bridge nodes. In FIG. 2, there are two fault conditions F1 and F2, one is between bridge nodes B3-B4 and the other is between bridge nodes B4-B5. TESI is also provisioned on the bridge nodes B6 and B7, and allows the traffic to be forwarded from node B6 to B4 and then from B7 to reach the destination.

During the normal operation of the network, i.e. when no faults have occur the traffic follows through the path as explained in forwarding table of various primary nodes. During fault occurrence the method of protection switching is followed.

Together, primary and backup TESIs form a group called Protection Group (PG). If there are M backups for N primary TESIs then it is (M: N) TESI PG. A TESI PG is an end-to-end protection mechanism. Each TEST is configured to traverse IB-BEBs (Backbone Edge Bridge) and BCBs (Backbone Core Bridge) by appropriately populating forwarding entries in the forwarding database (FDB). Provisioning information or entry in FDB is used in forwarding the TESI-data and -control frames. FDB entries over sequence of bridges pertaining to the forwarding behavior of the TESI-data are called data-path segments. FDB entries in adjacent bridges define a single hop data-path segment. FDB entries from IB-BEB to peer IB-BEB, through intermediate BCBs, if any, defines end-to-end data-path segment. FDB entries over a sequence of multiple bridges define a multi-hop data-path segment. That is, two or more sequential bridges with FDB entries pertaining to a TESI define a data-path segment for that TESI.

The sequence of bridges (i.e., the physical resources or networking infrastructure) over which FDB is provisioned define an infrastructure segment. LAN ports on adjacent bridges and the link or LAN interconnecting these two ports is single hop infrastructure segment. In general, a sequence of LAN ports and the intervening LANs and bridges form an infrastructure segment. End ports of an infrastructure segment are called Segment End-point Ports (SEPs).

Failure in infrastructure segment will imply failure in end-to-end data-path service. Of course, this assumes that infrastructure segment, and TESI-data and control plane are properly configured. Infrastructure Segment has its own Operations, Administrations and Management (OAM) mechanism. The infrastructure segment (IS) over which TESI frames flows, under no fault condition, is called primary-infrastructure segment (Primary-IS). A primary-IS could be protected by at least one backup-IS. Together, primary- and backup-IS form one Segment Protection Group (SPG). Each of multiple backups can be identified by an integer, m', as $m'^{th}$ backup-IS. If M' is maximum number of backup-IS associated with a primary-IS, then m'<=M'. SPG defines a segment protection domain: A domain is region wherein segment protection mechanism is active.

To monitor health of a segment a Maintenance End Point (MEP) is instantiated or configured on the segment end-point ports. A CCM, called Segment CCM (S-CCM) is exchanged between the MEPs of SEPs. Absence of SCCM within a given time interval will indicate occurrence of fault on the infrastructure segment.

Upon failure of primary-IS, TESI will be switched onto the backup-IS. Switching a TESI means an SPG will direct the TESI to the port associated with the backup-IS. Note: The FDB entry will map the TESI onto the SPG; and it is function of SPG to forward the TESI onto the appropriate (active) IS. For a TESI to flow seamlessly after protection switching, all intermediate bridges on the backup-IS should be pre-provisioned with the forwarding entries corresponding to the TESI. This pre-provisioning enables 50 ms protection switching time.

As described above, in FIG. 2 we have two segment protection domains adjacent to each other, and consequently, we have two SPG i.e. SPG1 and SPG2 (as shown in FIG. 2 with dotted lines). There will be no forwarding ambiguity in this example network topology. For each work infrastructure segment there is one protect or back up infrastructure segment. So, the TESI can be provisioned in a smoother manner.

Figure 3:
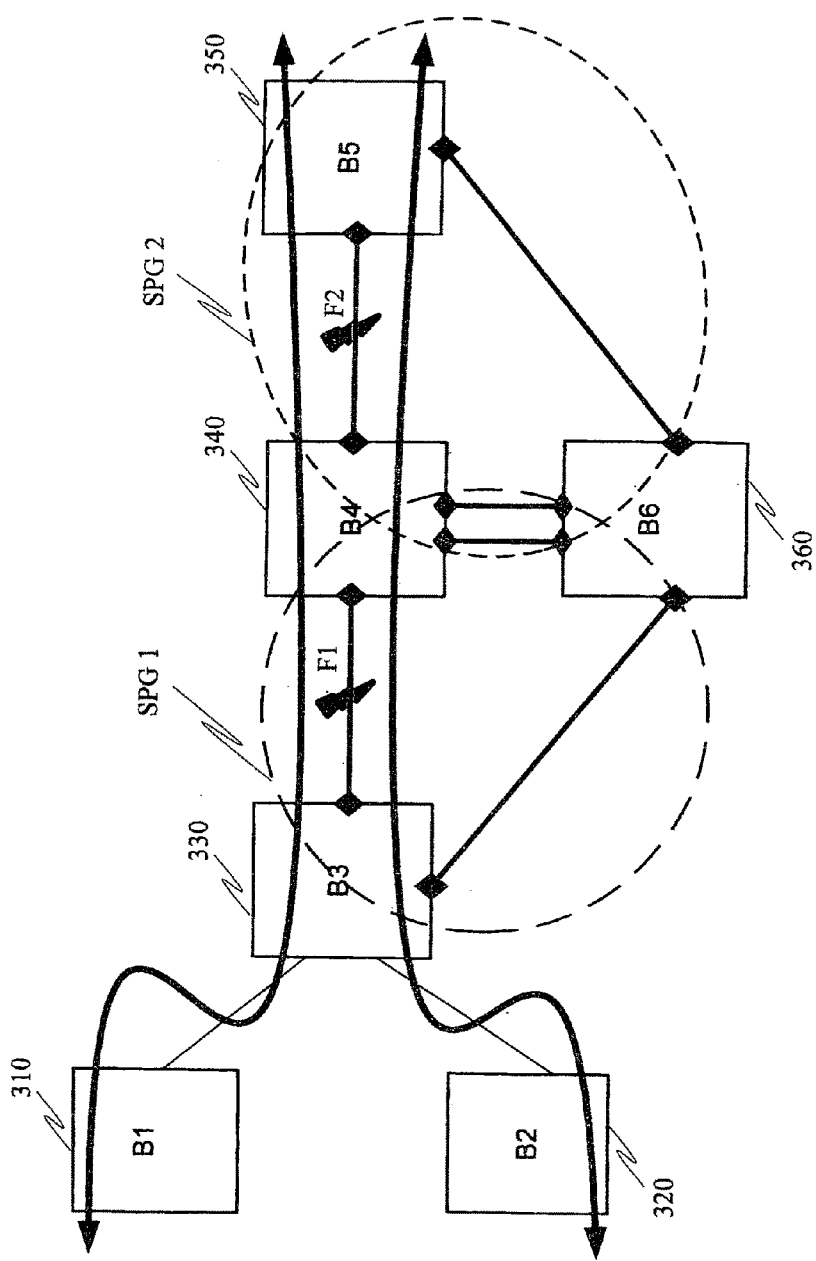
FIG. 3 shows problem in a network topology having communication fault on at least one tandem work segment in which TESI flows.

FIG. 3 shows a block diagram of a network topology having communication fault on at least one tandem work segment in which TESI flows. In the present topology (i.e. FIG. 3), the communication failure occurred on at least two tandem work infrastructure segments. The topology includes bridge nodes B1, B2, B3, B4, B5 and B6 in which TESI lines (T1 and T2) flows from B1 to B5 and the other line flows from B2-B5. In the network, the communication failure occurred between bridge node B3-B4 and B4-B5. For both work infrastructure segment i.e. between the bridge nodes B3-B4 and between B4-B5, there is only one protection infrastructure segment through bridge node B6. In an example operation mode, initially TESI flows from B3 to B4 and from B4 to B5 (which is called as work infrastructure segment). If there is a communication fault F1 (as shown in FIG. 3) occurs between the bridge nodes B3 to B4, then the TESI is provisioned through bridge node B6 (which is called as protection infrastructure segment). During the fault F1, the TEST flow from bridge nodes B1, B3, B6, B4, and B5.

If the communication fault F2 (as shown in FIG. 3) occurs between the bridge nodes B4 and B5, then the TESI is provisioned through bridge node B6 (which is the protection infrastructure segment for bridge nodes B4 and B5). During the fault F2, the TESI is provisioned to flow from B1, B3, B4, B6 and B5. Here we have two segment protection domains adjacent to each other, and consequently, we have two SPGs i.e. SPG1 and SPG2.

Even though SPG1 and SPG2 are provisioned to work independently, they will lead to forwarding ambiguity because of their adjacency when at least one of the two work-IS fails. If the faults F1 and F2 occurs simultaneously, it leads to forwarding ambiguity on the bridge node B6 (protection infrastructure segment), because TESI forwarding entry is maintained on two ports of bridge node 6 i.e. one towards bridge node B4 pertaining to SPG1, and another towards bridge node B5 pertaining to SPG2.

Moreover, when segment between bridge nodes B3 and B4 fails, TESI will be locally re-routed over backup infrastructure segment; thereby flowing over bridge nodes B3-B6-B4. Bridge node B6 has to forward the TESI-data and control frames towards bridge node B4. Since, TEST forwarding information is pre-provisioned on two ports of bridge node B6 i.e. one towards bridge node B4 pertaining to SPG1, and another towards bridge node B5 pertaining to SPG2, over which port should bridge node B6 forward the TESI. This is the problem of forwarding ambiguity arises from the present example network topology.

Similarly, when segment between bridge nodes B4 and B5 fails, TESI will be locally re-routed over backup infrastructure segment, thereby flowing over bridge nodes B4-B6-B5. Bridge node B6 has to forward the TESI data and control frames towards bridge node B5. A frame is never forwarded onto the port from where it entered the bridge and therefore the TESI frame will, despite two possible exits (towards bridge node B4 and bridge node B5), without any forwarding ambiguity, exit from a port facing bridge node B5. However, there will be forwarding ambiguity for TESI frames entering bridge node B6 from bridge node B5. The TESI frames reaching bridge node B6 from bridge node B5 will have two possible exit ports (one towards bridge node B4 and another towards bridge node B3). The forwarding ambiguity also arises at bridge node B6 when both the segment between bridge nodes B3-B4 and the segment between bridge nodes B4-B5 fails.

Figure 4:
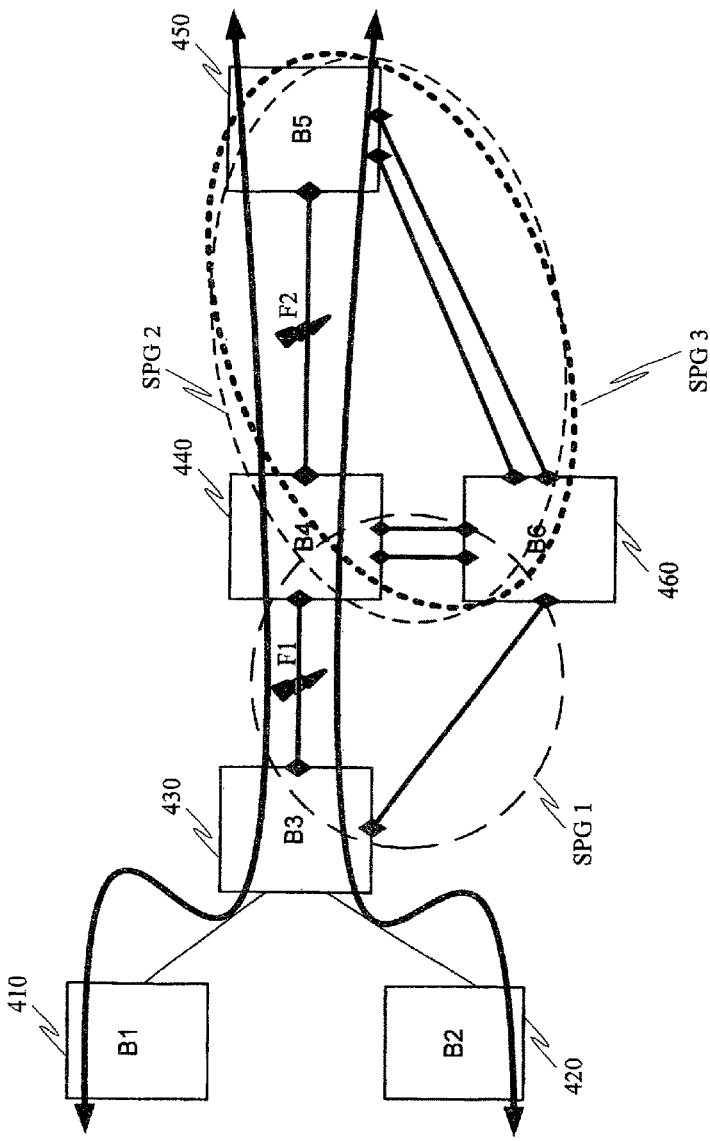
FIG. 4 illustrates solution to FIG. 3 of network topology in which communication fault occurs on at least one tandem work segment in which TESI flows.

FIG. 4 illustrates solution to FIG. 3 of network topology in which communication fault occurs on at least one tandem work segment in which TESI flows with one embodiment of the present invention. Let's consider TESIs flowing from bridge nodes B1 and B2 towards a common destination bridge node B5. There are two SPGs i.e. SPG1 and SPG2 (as shown in FIG. 4). Lets also focus on the SPG1 (with primary infrastructure segment being segment B3-B4 and backup infrastructure segment being segment B3-B6-B4). To avoid forwarding ambiguity at bridge node B6, we provision yet another SPG, called SPG3 (as shown in FIG. 4), beginning on bridge node B6 and ending on bridge node B5 with primary infrastructure segment as segment B6-B4-B5 and backup infrastructure segment as segment B6-B5.

Upon failure of primary infrastructure segment B3-B4, TESI is forwarded onto backup-infrastructure segment. This re-routed TESI will behave as client-layer traffic for the SPG3. If both primary infrastructure segment and backup infrastructure segment are healthy for the third SPG, then the SPG3 will forward the TESI towards bridge node B4 i.e., over primary infrastructure segment of the SPG3.

Upon failure of primary infrastructure segments of SPG1 and SPG2, TESI will be re-routed over backup infrastructure segment for SPG1. At bridge node B6, primary infrastructure segment of SPG3 has faults so bridge node B6 will forward the TESI over backup infrastructure segment of SPG3. There is no forwarding ambiguity. Similarly, to prevent forwarding ambiguity for TESI from bridge node B5 to bridge node B6, we will need one more SPG (primary infrastructure segment as B6-B4-B3 and backup infrastructure segment as B6-B3) not shown in figure. That is, we need SPG3 in conjunction with SPG1 to prevent forwarding ambiguity towards bridge node B5 at bridge node B6 and we need SPG4 (not shown in figure) in conjunction with SPG2 to prevent forwarding ambiguity at bridge node B6 for TESI flowing towards destinations B1 and B2.

Thus, using sequence of SPG as illustrated above, we can avoid forwarding ambiguity problem.

Logic needed to implement SPG:
Define SPG as set of primary-IS and m backup-IS;
If (primary-IS fails)
then, (Switch TESI over high-priority back-up IS).

Figure 5:
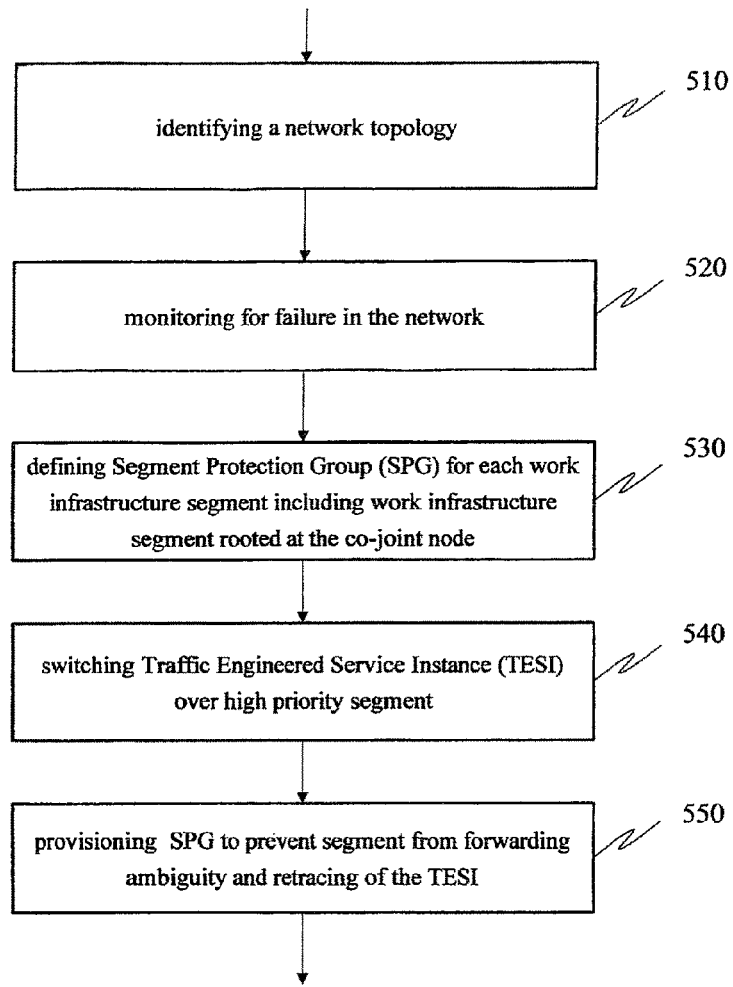
FIG. 5 illustrating an example protection switching method for an infrastructure segment of a Traffic Engineered Service Instance (TESI) having communication failure in a Provider Backbone Bridged Network (PBBN), wherein the communication failure occurred on at least two tandem work infrastructure segments.

FIG. 5 is a flowchart illustrating an example protection switching method 500 for an infrastructure segment of a Traffic Engineered Service Instance (TESI) having communication failure in a Provider Backbone Bridged Network (PBBN), wherein the communication failure occurred on at least two tandem work infrastructure segments of an embodiment of the present invention. At step 510, the method 500 identifies a network topology having one or more protection infrastructure segment for each work infrastructure segment, such that the work infrastructure segment and the corresponding protection infrastructure segment terminate on the same nodes, which is called segment-end nodes.

The two protection infrastructure segments pass through one or more bridge node, which is called a co-joint node. The step 510 also identifies the first Segment Protection Group (SPG) of the co-joint node having one or more protection infrastructure segment and work infrastructure segment, such that work infrastructure segment and the protection infrastructure segment initiate from the co-joint node and terminates on the segment end node towards the destination node. More over, the step 510 also identifies the second SPG of the co-joint node having one or more protection infrastructure segment and work infrastructure segment, such that work infrastructure segment and the protection infrastructure segment initiate from the co-joint node and terminates on the segment end node towards the source node.

At step 520, the method monitoring for failure in the work and protection infrastructure segment in the network. At step 530, the method defines Segment Protection Group (SPG) for each work infrastructure segment including work infrastructure segment rooted at the co-joint node. The SPG is formed by a set of work infrastructure segment and the protection infrastructure segments. At step 540, the method switches the Traffic Engineered Service Instance (TESI) over high priority protection infrastructure segment. At step 550, the method provisioned the two SPG of co-joint node to prevent infrastructure segment from forwarding ambiguity and retracing of the TESI.

Although the flowchart 500 includes steps 510-550 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

The present invention may be implemented with a variety of combination of hardware and software. If implemented as a computer-implemented apparatus, the present invention is implemented using means for performing all of the steps and functions described above.

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A protection switching method for an infrastructure segment of a Traffic Engineered Service Instance (TESI) having one or more communication failures in a Provider Backbone Bridged Network (PBBN), wherein the one or more communication failures occurred on at least two tandem work infrastructure segments, the method comprising:
    identifying a network topology including at least one protection infrastructure segment for each tandem work infrastructure segment, such that the tandem work infrastructure segment and the corresponding protection infrastructure segment terminate on a same node, called a segment end node, wherein two protection infrastructure segments pass through at least one bridge node, called a co-joint node;
    monitoring for the one or more communication failures in the tandem work infrastructure segment and the protection infrastructure segment in the network topology;
    defining a Segment Protection Group (SPG) for each tandem work infrastructure segment including the tandem work infrastructure segment rooted at the co-joint node, wherein the SPG is formed by a set of tandem work infrastructure segments and protection infrastructure segments;
    switching the TESI over a high priority protection infrastructure segment;
    and provisioning two SPGs of the co-joint node to prevent the protection infrastructure segment from forwarding ambiguity and retracing of the TESI.

2. The method of claim 1, wherein the step of identifying further including:
    identifying the first SPG of the co-joint node comprising the at least one protection infrastructure segment and the tandem work infrastructure segment, such that the tandem work infrastructure segment and the protection infrastructure segment initiate from the co-joint node and terminates on the segment end node towards the destination node.

3. The method of claim 1, wherein the step of identifying further includes:
    identifying the second SPG of the co-joint node comprising the at least one protection infrastructure segment and the tandem work infrastructure segment, such that the tandem work infrastructure segment and the protection infrastructure segment initiate from the co-joint node and terminates on the segment end node towards the source node.

4. The method of claim 1, further comprising:
    pre-provisioning the TESI forwarding entities in intermediate bridges forming part of the protection infrastructure segment.

5. The method of claim 1, further comprising:
    reversioning of the TESI onto the tandem work infrastructure segment upon recovery from the one or more communication failures.

6. The method of claim 1, wherein the step of monitoring further comprising:
  instantiating a Maintenance End Point (MEP) on Segment End-Point Ports (SEP) of the infrastructure segment and Maintenance Intermediate Point (MIP) on Segment Intermediate Ports (SIP).

7. The method of claim 6, further comprising:
  checking for segment-continuity check message on the SEP of the tandem work infrastructure segment and protection infrastructure segment.

8. The method of claim 7, further comprising:
  Indicating an occurrence of fault in the infrastructure segment when the segment continuity check message is not received within a predetermined time period.

9. A protection switching system for an infrastructure segment of a Traffic Engineered Service Instance (TESI) having one or more communication failures in a Provider Backbone Bridged Network (PBBN), wherein the one or more communication failures occurred on at least two tandem work infrastructure segments, the system comprising:
  a plurality of nodes interconnected defining a topology, wherein the topology includes at least one protection infrastructure segment for each tandem work infrastructure segment, such that the tandem work infrastructure segment and the corresponding protection infrastructure segment terminate on a same node, called a segment end node, wherein the two protection infrastructure segments pass through at least one bridge node called a co-joint node;
  and a network channel connected to each of the nodes for transmitting and receiving Continuity Check Message (CCMs), wherein each node is configured for defining a Segment Protection Group (SPG) for each work infrastructure segment, the tandem work infrastructure segment including the tandem work infrastructure segment rooted at the co-joint node, wherein the SPG is formed by a set of tandem work infrastructure segments and the protection infrastructure segments, and monitoring any communication failures in the work and protection infrastructure segments in the network topology and switching TESI over a high priority protection infrastructure segment and provisioning SPGs of the co-joint node to prevent the protection infrastructure segment from forwarding ambiguity and retracing of the TESI.

10. The system of claim 9, wherein the plurality of nodes further comprise:
  a processor for pre-provisioning TESI forwarding entities in intermediate bridges forming the protection infrastructure segment.

11. The system of claim 9, wherein the plurality of nodes further comprise:
  circuitry for reversioning of TESI onto the tandem work infrastructure segment upon recovery from the one or more communication failures.

12. The system of claim 9, wherein the plurality of nodes are further configured for instantiating a Maintenance End Point (MEP) on Segment End-Point Ports (SEP) of the infrastructure segment, and a Maintenance Intermediate Point (MIP) on Segment Intermediate Ports (SIP), wherein each node of the plurality of nodes is capable of checking for segment continuity check messages on the SEP of the tandem work infrastructure segment and the protection infrastructure segment.

* * * * *